United States Patent [19]
Schulz-Hennig et al.

[11] Patent Number: 4,694,152
[45] Date of Patent: Sep. 15, 1987

[54] METHOD AND APPARATUS FOR ACOUSTIC SUPERVISION OF ADJUSTMENT OPERATIONS AT OPTICAL DEVICES

[75] Inventors: Joerg Schulz-Hennig, Heikendorf; Horst Sievers, Preetz, both of Fed. Rep. of Germany

[73] Assignee: Dr. Ing. Rudolf Hell GmbH, Fed. Rep. of Germany

[21] Appl. No.: 743,514

[22] Filed: Jun. 11, 1985

[30] Foreign Application Priority Data

Jun. 18, 1984 [EP] European Pat. Off. ........ 84106943.8

[51] Int. Cl.$^4$ ............................................... G01J 1/20
[52] U.S. Cl. .................................... 250/201; 356/153; 356/400
[58] Field of Search ............... 250/201, 203; 356/141, 356/152, 400, 153

[56] References Cited

U.S. PATENT DOCUMENTS

| | | | |
|---|---|---|---|
| 3,907,435 | 9/1975 | Roodvoets | 356/152 |
| 4,081,216 | 3/1978 | Cook | 356/256 |
| 4,126,834 | 11/1978 | Coppock | 332/7.51 |

FOREIGN PATENT DOCUMENTS

| | | |
|---|---|---|
| 2850743 | 5/1980 | Fed. Rep. of Germany . |
| 3151834 | 8/1982 | Fed. Rep. of Germany . |
| 428322 | 1/1975 | U.S.S.R. ............................. 356/141 |

OTHER PUBLICATIONS

Applied Optics, vol. 18, No. 17, Sep. 1, 1979, "Acoustooptic Modulator Intensity Servo" by Howard P. Layer, pp. 2947-2949.

Primary Examiner—David C. Nelms
Assistant Examiner—Crystal D. Cooper
Attorney, Agent, or Firm—Hill, Van Santen, Steadman & Simpson

[57] ABSTRACT

A method and apparatus for acoustic supervision of adjustment of a light bundle composed of component beams with respect to its intensity distribution in an expanse of a reference plane situated in a beam path at right angles to an optical axis of the light bundle. Intensity values I of the component beams lying at a margin of the light wave are measured and the differential intensity values ΔI are identified according to amount and operational sign. An oscillation is generated whose parameters are modified dependent on the amounts and operational signs of the respective differential intensity values. The modified oscillation is made audible as a distinguishable measuring tone for amounts and operational signs of the differential intensity values ΔI.

11 Claims, 1 Drawing Figure

U.S. Patent  Sep. 15, 1987  4,694,152
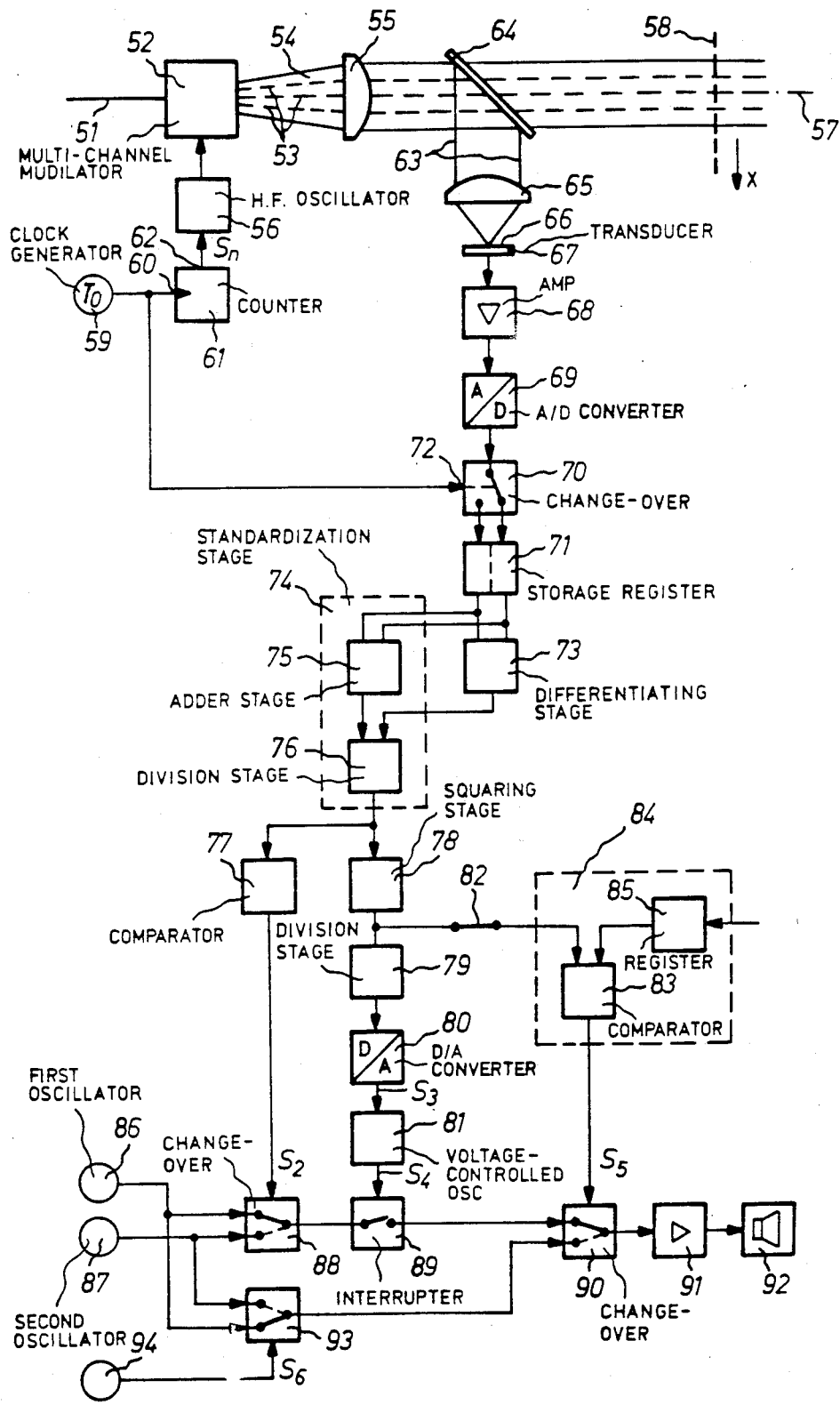

METHOD AND APPARATUS FOR ACOUSTIC SUPERVISION OF ADJUSTMENT OPERATIONS AT OPTICAL DEVICES

RELATED APPLICATIONS

The following patent applications of the same inventors of the instant case are related to the present case: "Method And Apparatus For Acoustic Supervision of Adjustment Operations At Optical Devices", Ser. No. 743,516; and "Method And Apparatus For Acoustic Supervision of Adjustment Operations At Optical Devices", Ser. No. 743,370.

BACKGROUND OF THE INVENTION

The present invention relates to the fields of imaging optics and of laser optics, and relates to optical devices wherein the intensity distribution in a light bundle composed of component beams particularly in a laser light bundle, must be adjusted relative to the expanse of a reference plane situated in the beam path at right angles to the optical axis of the light bundle.

The intensity distribution, the attitude, or the direction of a light bundle are influenced by optical components such as mirrors, deflecting prisms, lenses, optically transparent plane-parallel plates and wedge plates, groove grating, holographic deflection diaphragms, acoustic multi-frequency modulators, or acousto-optical reflectors. Finally, the light source itself can also be moved. The adjustment of a light bundle with respect to its intensity distribution, its attitude, or its direction occurs by means of suitable adjustment means in the form of mechanical adjustments such as mirror mounts or in the form of electro-mechanical adjustments such as piezo drives. It is known for supervising the adjustment of a light bundle to observe gauges such as targets, screens, or apertured diaphragms during the adjustment operation, or to make the signals of suitable photodetectors visible, for example on an oscilloscope.

The known adjustment aids, however, are not precise enough in many instances, sometimes do not supply an unequivocal statement regarding an optimal adjustment, and are occasionally also difficult to manipulate. Due to the exposed position of an adjustment means or the compact structure of an optical apparatus, also it is often not possible to undertake a precise observation or supervision of the adjustment simultaneously with the adjustment operation.

SUMMARY OF THE INVENTION

It is therefore an object of the present invention to specify a method and an apparatus for acoustic supervision of the intensity distribution in a light bundle composed of a component beam with respect to an expanse of a reference plane situated in the beam path at right angles to the optical axis of the light bundle with the assistance of which the adjustment can be more easily and precisely executed and with which, moreover, the required steps for an optimum adjustment are signalled in terms of size and direction.

This object is achieved by providing a method for acoustic supervision of adjustment of a light bundle composed of component beams with respect to its intensity distribution across an expanse of a reference plane at right angles to an optical axis of and situated in the beam path of the light bundle wherein intensity values existing during adjustment from at least component beams which lie at a margin of the light bundle in a direction of the expanse of the reference plane are measured. Differential intensity values in terms of amount and operational sign are identified and added up based upon two adjacent component beams in the direction of the expanse of the reference plane. An oscillation is generated, and parameters of the oscillation are modified dependent on an amount and on an operational sign of the respective, added-up differential intensity values. The modified oscillation is made audible as a measuring tone distinguishable according to amount and operational sign.

BRIEF DESCRIPTION OF THE DRAWING

The drawing FIGURE shows a diagram of an exemplary embodiment of an acoustic supervision means for a light bundle adjustment with respect to its intensity distribution.

DESCRIPTION OF THE PREFERRED EMBODIMENTS

The drawing figure shows an exemplary embodiment of an apparatus for supervising the adjustment of a light bundle with respect to its intensity distribution in an expanse of a prescribed reference plane at right angles to the optical axis of the light bundle. The intensity distribution in the light bundle can, for example, be established by the adjustment of the Bragg angle of an acousto-optical modulator (AOM).

In the illustrated exemplary embodiment, for example, a laser beam 51 is split in an acousto-optical multi-channel modulator 52 into n divergent component beams 53 of a light bundle 54 which are parallelized by means of a positive lens 55.

The acousto-optical multi-channel modulator 52 is composed essentially of a crystal block into which an ultrasonic wave of different frequency is coupled in by means of a piezo-electric oscillator for every channel. As a consequence of the electric oscillator for every channel. As a consequence of the ultrasonic wave being propagated in the crystal block, a part of the incident light beam 51 is diffracted to a different direction, and emerges from the crystal block as component beam 53 of one channel. An optimum diffraction is achieved when the incident light beam 51 enters into the crystal block at a defined angle, referred to as the Bragg angle. The different-frequency, high-frequency signals required for the drive of a piezo-electric oscillator for the individual channels are generated in a HF oscillator 56. By disconnecting the high-frequency signal of a channel by a corresponding control signal $S_n$ to the HF oscillator 56, the corresponding component beam 53 of the channel can be suppressed.

A more detailed description of such acousto-optical modulators may be found, for example, in "Optoelectronics--An Introduction", J. Wilson and J. F. B. Hawkes, Prentice Hall International, Inc., New Jersey, 1983, incorporated herein by reference.

The intensity distribution within the light bundle 54 is influenced by the distribution of the frequencies and of the amplitudes of the high-frequency voltages for the individual channels. Over and above this, the intensity distribution of the light bundle 54 is adjusted by changing the Bragg angle of the modulator 52 around an axis which proceeds perpendicular to the light beam 51 and perpendicular to the propagation direction of the ultrasonic waves (Bragg angle adjustment).

The light bundle 54 should, for example, comprise a symmetrical intensity distribution $I=f(x)$ within an expanse (x) of a reference plane 58 lying at right angles to the optical axis 57 of the light bundle 54. For identifying the intensity distribution during the adjustment operation, the intensity values I of some channels or component beam 53, including the marginal rays 63 of the light bundle 54, are measured. In general, it is adequate, as in the exemplary embodiment, to measure only the intensity values $I_l$ and $I_n$ of the marginal rays 63 of the first and $n^{th}$ channels of the modulator 52. For this purpose, a clock generator 59 generates a clock sequence $T_0$ which is counted into a cyclical counter 61 via a clock input 60. The counter 61 thus generates a digital control Signal $S_n$ at its data output 62 which alternately engages the marginal rays of the first and $n^{th}$ channels of the acousto-optical modulator 52, whereas the other component beams remain suppressed. The marginal rays 63 are mirrored out with a partially transmitting planar mirror 64 situated in the beam path of the light bundle 54, and are focused onto the measured surface 66 of an optoelectronic transducer 67 with a positive lens 65, this optoelectronic transducer 67 continuously successively measuring the intensity values $I_l$, $I_n$ of the two marginal rays 63 during the adjustment operation by means, for example, of changing the Bragg angle adjustment at the modulator 52. The measured intensity values $I_l$ and $I_n$ are amplified in an amplifier 68 and are digitized in a following A/D converter 69. The measuring installation, of course, can also be disposed in the beam path of the light bundle 54.

The continuously successively measured intensity values $I_l$ and $I_n$ of the two marginal rays 63 are intermediately stored in a register 71 with the assistance of an electronic change-over 70 such that the respective intensity values $I_l$ of the one marginal ray are deposited in one sub-region of the register and the respective intensity values $I_n$ of the other marginal ray are deposited in the other sub-region of the register 71. For this purpose, the control input 72 of the electronic change-over 70 is charged with the clock sequence $T_0$, so that the electronic change-over 70 is switched synchronously with the engagement and disengagement of the two marginal rays 63.

Deviating from the exemplary embodiment, in case it is not only the intensity values I of the marginal rays which are employed for determining the intensity distribution, the intensity difference between two adjacent component beams, and the sum of the individual intensity differnces which correspond to the intensity difference of the marginal rays, are formed. Since only the intensity values $I_l$ and $I_n$ of the marginal rays are measured in the exemplary embodiment, only the differential intensity values $\Delta I = I_n - I_l$ are formed in a differentiating stage 73, for which purpose the intensity values $I_l$ and $I_n$ are read out from the register 71. Since in most instances it is again not the absolute but the relative intensity distribution which is of interest, the differential intensity values $\Delta I$ are standardized in a standardization stage at 74. For this purpose, the sum value $\Delta I = I_l + I_n$ is first formed in an adder stage 75 of the standardization stage 74 and the standardized differential intensity values $\Delta \bar{I}$ are formed in a division stage 76 as quotients from the differential intensity value $\Delta I$ and the sum value $\Sigma I$. The standardized differential intensity values $\Delta \bar{I}$ characterize the direction and intensity of the asymmetry in the intensity distribution of the light bundle 54 by operational sign and amount, and thus also characterize operational sign and direction of the Bragg angle error of the acousto-optical modulator 52.

The operational signals of the standardized differential intensity values $\Delta \bar{I}$ are identified in a comparator 77 by comparison of the standardized differential intensity values $\Delta \bar{I}$ greater than or less than zero, and a control signal $S_2$ corresponding to the respectively identified operational sign is then generated.

The standardized differential intensity values $\Delta \bar{I}$ are modified according to a prescribed function, are squared in the exemplary embodiment in a squaring stage 78, and the reciprocals $1/(\Delta \bar{I})^2$ are formed in a following division stage 79 from the squared, standardized differential intensity values $(\Delta \bar{I})^2$.

In the illustrated exemplary embodiment, the reciprocals $1/(\Delta \bar{I})^2$ are converted in a D/A converter 80 into an analog control signal $S_3$ for a voltage-controlled oscillator 81 (VCO). The voltage-controlled oscillator 81 generates a periodic control signal $S_4$ whose frequency is proportional to the reciprocals $1/(\Delta \bar{I})^2$.

The standardized and squared differential intensity values $(\Delta \bar{I})^2$ acquired in the squaring stage 78 are forwarded via a switch 82 to a comparator 83 of a threshold circuit 84 and are compared there to a standardized limit value $I_g$ deposited in the register 85. The limit value $\bar{I}_g$ characterizes a permissible deviation from the exact adjustment to $(\Delta \bar{I})^2 = 0$. When the standardized squared differential intensity values $(\Delta \bar{I})^2$ fall below this limit value $\bar{I}_g$, the comparator 83 generates a further control signal $S_5$.

A first oscillator 86 which generates a high frequency oscillation of, for example, 2000 Hz, and a second oscillator 87 which emits a low frequency oscillation of for example, 150 Hz, are connected to an electro-acoustical transducer, for example to a loudspeaker 92 for generating measuring tones. It is connected thereto via an electronic change-over 88 controlled by the control signal $S_2$, via an interrupter 89 clocked by the control signal $S_4$, via a further electronic change-over 90 controlled by the control signal $S_5$, and via an amplifier 91. Dependent on the position of the electronic change-over 90, the two oscillators 86 and 87 can also be connected to the loudspeaker 92 via a change-over 90 and a clocked change-over 93 clocked by a low frequency control signal $S_6$ of, for example, 4 Hz generated in a clock generator 94.

In the adjustment operation, either the oscillator 86 or the oscillator 87 is switched to the loudspeaker 92 by the change-over 88 depending on the operational sign of the identified differential intensity values $(\Delta \bar{I})$, i.e., dependent on the error direction. A correspondingly high or low measuring tone is thus generated. Dependent on the amounts of the squared differential intensity values $(\Delta \bar{I})^2$, these measuring tones are interrupted by means of the interrupter 89 such that the interrupter frequency rises quadratically with decreasing differential intensity values. When the squared differential intensity values $(\Delta \bar{I})^2$ fall below the prescribed limit value $I_g$, the electronic change-over 90 switches into the position shown in broken lines, whereby the low and the high measuring tone, controlled by the clocked interrupter 93, become audible.

In case a more precise adjustment to the differential intensity values $\Delta I = 0$ is required, the threshold circuit 84 can again be disabled by actuating the switch 82, so that the change-over 90 remains in the illustrated position. In this case, the interrupter frequency of the interrupter 89 rises so greatly given approach to the differential intensity value of 0 that nearly a continuous measuring tone is generated. It is thus insured that the comparator 77 emits a defined control signal $S_3$ given the condition $\Delta I=0$ in which it perceives no operational sign. The change-over 88 thus also remains in a defined position.

The manner of generating the measured tone is not limited to the exemplary emobodiment described. It is within the framework of the invention to make the differential intensity values audible in terms of amount and direction in any other way. For example, the amplitude, the pulse duty factor, or the keying ratio of an oscillation can be modified, dependent on the identified differential intensity values, whereby the volume, the interruption duration, or the interruption frequency of the measuring tone are changed.

If, instead of the relative intensity distribution, an absolute intensity distribution should nonetheless be of interest, the standardization stage 74 is bridged or entirely omitted. An absolute limit value is then also loaded into the register 85 of the threshold circuit 84.

Although various minor changes and modifications might be proposed by those skilled in the art, it will be understood that we wish to include within the claims of the patent warranted hereon all such changes and modifications as reasonably come within our contribution to the art.

We claim as our invention:

1. A method for symmetrically adjusting an intensity distribution formed by rays of a light bundle along a given direction line lying in a reference plane which lies transverse to an optical axis of the light bundle, comprising the steps of:
   measuring intensity values of first and second rays of said intensity distribution symmetrically spaced from and on opposite sides of said optical axis;
   calculating a differential intensity value from said first and second rays, an amount of said differential intensity value being indicative of an amount of deviation from a desired symmetry for said intensity distribution, and a sign of said differential intensity value being indicative of a direction away from said desired symmetry of the intensity distribution; and
   providing an audible oscillation, and changing a first parameter of said audible oscillation based on said differential intensity value amount and changing a second parameter of said audible oscillation based on said intensity value sign.

2. A method according to claim 1 wherein said first parameter is an interruption frequency of said oscillation and said second parameter is a frequency of said oscillation.

3. A method according to claim 1 wherein the differential intensity value is standardized.

4. A method according to claim 3 wherein the differential intensity value is standardized by adding up the first and second intensity values and then dividing the differential intensity value by the added up intensity values.

5. A method according to claim 1 wherein a limit value is provided which represents an allowed deviation from the desired symmetry of the intensity distribution, said limit value is compared to the differential intensity value, and based on this comparison, making audible with said audible oscillation that the allowed deviation from the desired symmetry has been achieved.

6. A method according to claim 1 wherein said first and second rays are outermost marginal rays of the light bundle.

7. A method according to claim 1 wherein said differential intensity value is squared.

8. A method according to claim 7 wherein a reciprocal of the squared differential intensity value is formed.

9. A method for symmetrically adjusting an intensity distribution formed by rays of a light bundle along a given direction line lying in a reference plane which lies transverse to an optical axis of the light bundle, comprising steps of:
   measuring intensity values of first and second rays of said intensity distribution at a same distance from and on opposite sides of said optical axis;
   calculating a differential intensity value from said first and second rays, an amount of said differential intensity value being indicative of an amount of deviation from a desired symmetry for said intensity distribution, and a sign of said differential intensity value being indicative of a direction away from said desired symmetry of the intensity distribution; and
   providing an audible oscillation, and changing an interruption frequency of said audible oscillation based on said differential intensity value amount and changing an oscillation frequency parameter of said audible oscillation based on said intensity value sign.

10. A system for symmetrically adjusting an intensity distribution formed by rays of a light bundle along a given direction line lying in a reference plane which lies transverse to an optical axis of the light bundle, comprising:
    measuring intensity values of first and second rays of said intensity distribution at a same distance from and on opposite sides of said optical axis;
    means for calculating a differential intensity value from said first and second rays, an amount of said differential intensity value being indicative of an amount of deviation from a desired symmetry for said intensity distribution, and a sign of said differential intensity value being indicative of a direction away from said desired symmetrical of the intensity distribution; and
    means for providing an audible oscillation and changing a first parameter of said audible oscillation based on said differential intensity value amount and changing a second parameter of said audible oscillation based on said intensity value sign.

11. A system for symmetrically adjusting an intensity distribution formed by rays of a light bundle along a given direction line lying in a reference plane which lies transverse to an optical axis of the light bundle, comprising:
    means for measuring intensity values of first and second rays of said intensity distribution at a same distance from and on opposite sides of said optical axis;
    means for calculating a differential intensity value from said first and second rays, an amount of said differential intensity value being indicative of an amount of deviation from a desired symmetry for said intensity distribution, and a sign of said differential intensity value being indicative of a direction away from said desired symmetry of the intensity distribution; and
    means for providing an audible oscillation and changing an interruption frequency of said audible oscillation based on said differential intensity value amount of changing an oscillation frequency of said audible oscillation based on said intensity value sign.

* * * * *